US 12,053,835 B2

(12) United States Patent
Galbraith et al.

(10) Patent No.: US 12,053,835 B2
(45) Date of Patent: Aug. 6, 2024

(54) MONITORING MATERIAL PROCESSING USING IMAGING SIGNAL DENSITY DETERMINED FROM INLINE COHERENT IMAGING (ICI)

(71) Applicant: IPG PHOTONICS CORPORATION, Oxford, MA (US)

(72) Inventors: Christopher M. Galbraith, Ottawa (CA); Jordan Kanko, Kingston (CA); Paul J. L. Webster, Kingston (CA); Cole Van Vlack, Kingston (CA); Genevieve Elizabeth Hayes, Calgary (CA)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 17/937,058

(22) Filed: Sep. 30, 2022

(65) Prior Publication Data

US 2023/0016054 A1  Jan. 19, 2023

Related U.S. Application Data

(63) Continuation of application No. 16/721,306, filed on Dec. 19, 2019, now Pat. No. 11,458,566.
(Continued)

(51) Int. Cl.
*B23K 26/03* (2006.01)
*B23K 26/082* (2014.01)
(Continued)

(52) U.S. Cl.
CPC .......... *B23K 26/032* (2013.01); *B23K 26/082* (2015.10); *B23K 31/125* (2013.01); *G01B 9/0201* (2013.01); *G01B 9/02014* (2013.01)

(58) Field of Classification Search
CPC .... B23K 26/24; B23K 26/082; B23K 26/032; B23K 31/125; G01B 11/02
See application file for complete search history.

(56) References Cited

U.S. PATENT DOCUMENTS

| 5,387,969 A | 2/1995 | Marantette |
| 5,446,547 A | 8/1995 | Guenther et al. |

(Continued)

FOREIGN PATENT DOCUMENTS

| DE | 10155203 | 6/2003 |
| DE | 102007032743 | 1/2009 |

(Continued)

OTHER PUBLICATIONS

European Communication Pursuant to Rule 114(2) EPC mailed Mar. 31, 2021 along with Observations by Third Party in corresponding European Patent Application No. 11826290.6.
(Continued)

*Primary Examiner* — Thien S Tran
(74) *Attorney, Agent, or Firm* — Grossman, Tucker, Perreault & Pfleger, PLLC

(57) ABSTRACT

Systems, methods and apparatuses are used for monitoring material processing using imaging signal density calculated for an imaging beam directed to a workpiece or processing region, for example, during inline coherent imaging (ICI). The imaging signal density may be used, for example, to monitor laser and e-beam welding processes such as full or partial penetration welding. In some examples, the imaging signal density is indicative of weld penetration as a result of reflections from a keyhole floor and/or from a subsurface structure beneath the keyhole. The monitoring may include, for example, automated pass/fail or quality assessment of the welding or material processing or parts produced thereby. The imaging signal density may also be used to control the welding or material processing, for example, (Continued)

using imaging signal density data as feedback. The imaging signal density may be used alone or together with other measurements or metrics, such as distance or depth measurements.

18 Claims, 13 Drawing Sheets

Related U.S. Application Data

(60) Provisional application No. 62/782,071, filed on Dec. 19, 2018.

(51) Int. Cl.
    *B23K 31/12*     (2006.01)
    *G01B 9/02001*     (2022.01)

(56) References Cited

U.S. PATENT DOCUMENTS

| | | |
|---|---|---|
| 6,454,761 B1 | 9/2002 | Freedman |
| 6,755,819 B1 | 6/2004 | Waelti |
| 7,411,682 B2 | 8/2008 | Moshe |
| 7,688,453 B2 | 3/2010 | Willby et al. |
| 8,822,875 B2 | 9/2014 | Webster et al. |
| 9,757,817 B2 | 9/2017 | Webster |
| 10,124,410 B2 | 11/2018 | Kanko et al. |
| 2005/0133488 A1 | 6/2005 | Blankenship |
| 2012/0138586 A1* | 6/2012 | Webster .............. B23K 26/20 219/121.64 |
| 2012/0285936 A1 | 11/2012 | Urashima et al. |
| 2016/0039045 A1 | 2/2016 | Webster |
| 2017/0120337 A1* | 5/2017 | Kanko ................. B33Y 10/00 |
| 2018/0178320 A1 | 6/2018 | Webster |
| 2018/0264600 A1 | 9/2018 | Sugino |
| 2019/0143458 A1* | 5/2019 | Strebel ............... B23K 26/032 219/121.64 |
| 2020/0023461 A1 | 1/2020 | Galbraith et al. |

FOREIGN PATENT DOCUMENTS

| | | |
|---|---|---|
| EP | 0792717 B1 | 7/2000 |
| EP | 1238744 | 9/2002 |
| EP | 1361015 A1 | 11/2003 |
| EP | 1977850 | 10/2008 |
| EP | 3753667 A1 | 12/2020 |
| WO | 2018-136622 | 1/2018 |

OTHER PUBLICATIONS

Wikipedia; "Optical Coherence Tomography" dated Sep. 14, 2011.
Webster, P.J.L., et al., "In situ 24 kHz coherent imaging of morphology change in laser percussion drilling", Optics Letters, vol. 35, No. 5, 646-648 (2010).
International Search Report and Written Opinion mailed Apr. 23, 2020 in corresponding PCT Patent Application No. PCT/US2019/067542.
Ji, Yang; "Inline Coherent Imaging Applied to Laser Micromachining;" A thesis submitted to the department of physics, engineering physics and astronomy in conformity with the requirements for the degree of master of applied science; Queen's University; Apr. 2014; pp. 1-86.
Bautze et al.; "Use of Inline Coherent Imaging for Laser Welding Processes: Process Control and Beyond;" Lasers in Manufacturing Conference 2015; pp. 1-10.
Office Action from related European Appln. No. 19900782.4 dated Sep. 13, 2022. 6 pages.

* cited by examiner

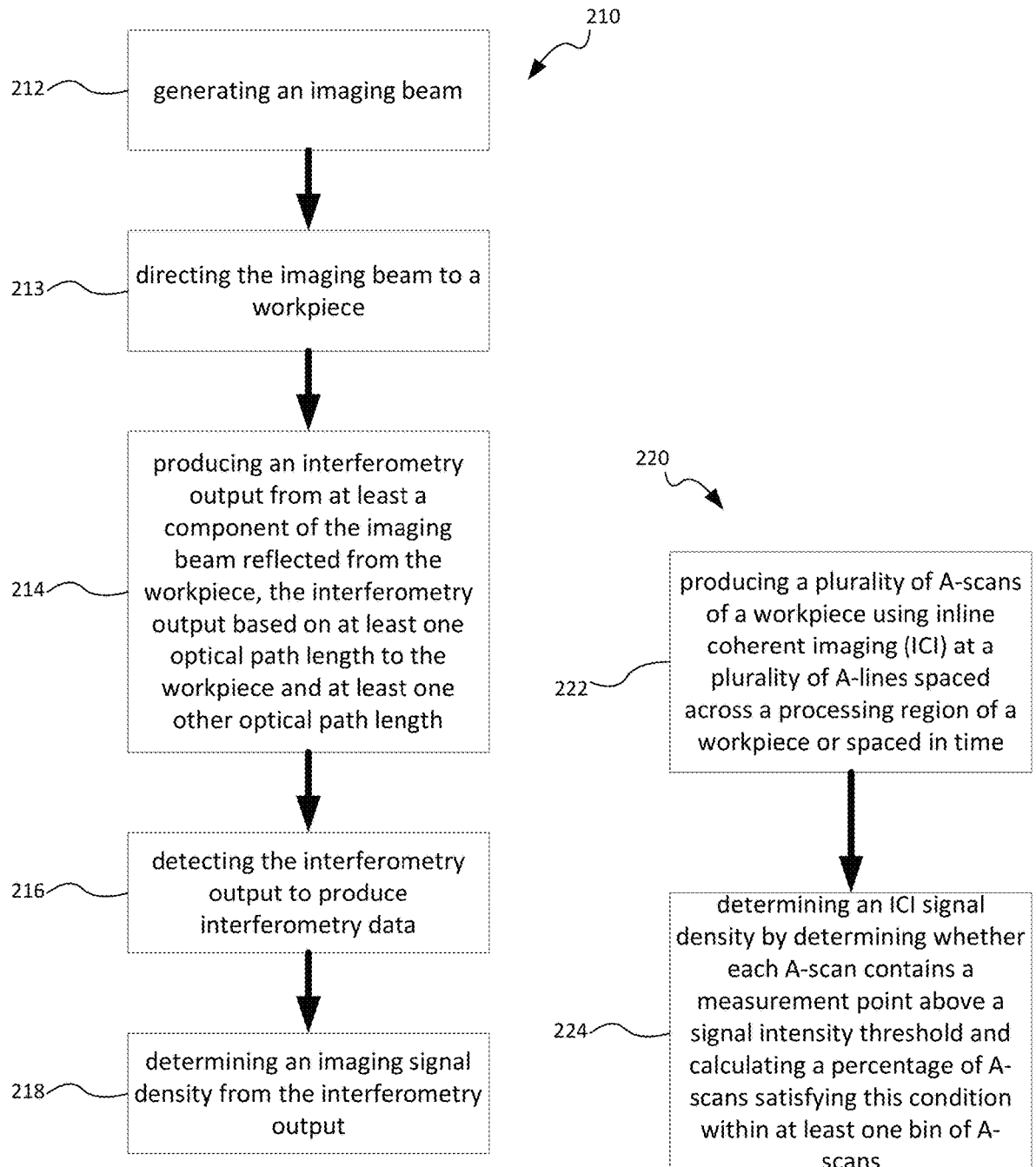

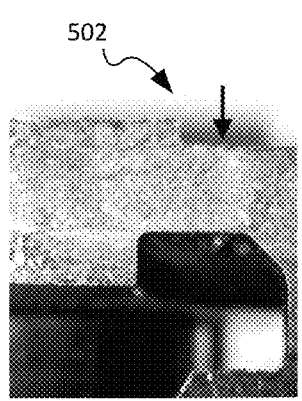 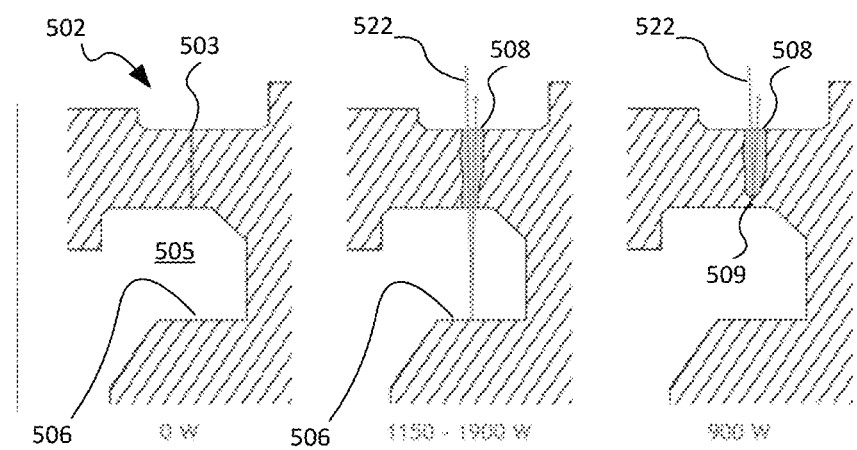
FIG. 5A  FIG. 5B  FIG. 5C  FIG. 5D
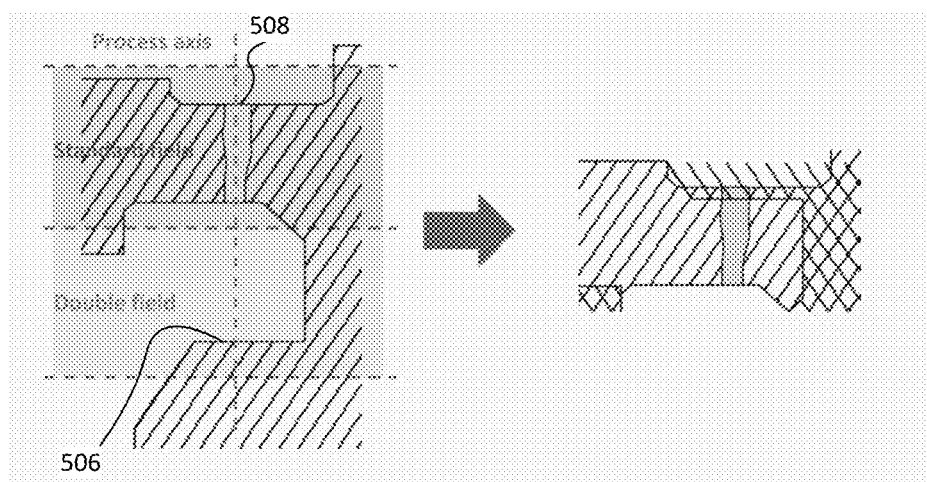
FIG. 5E

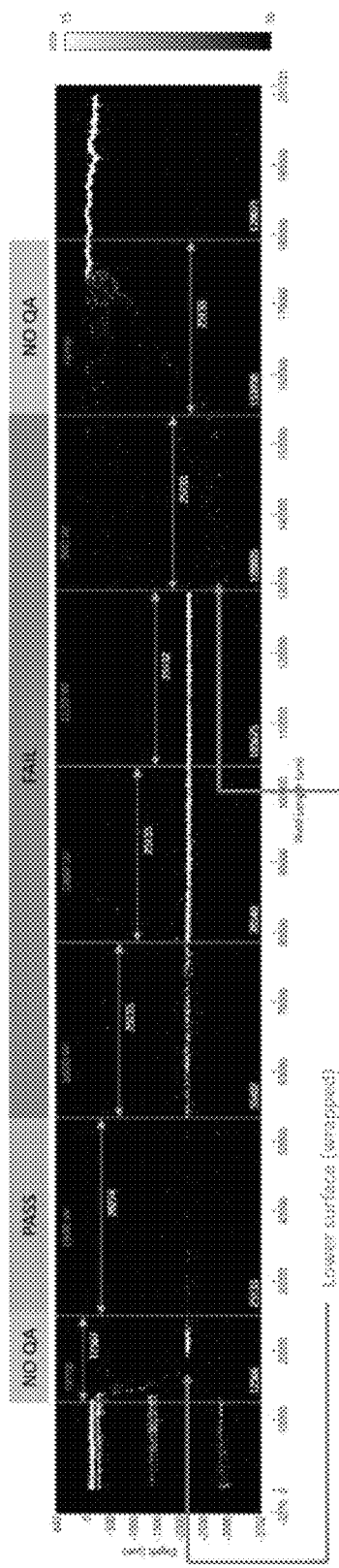
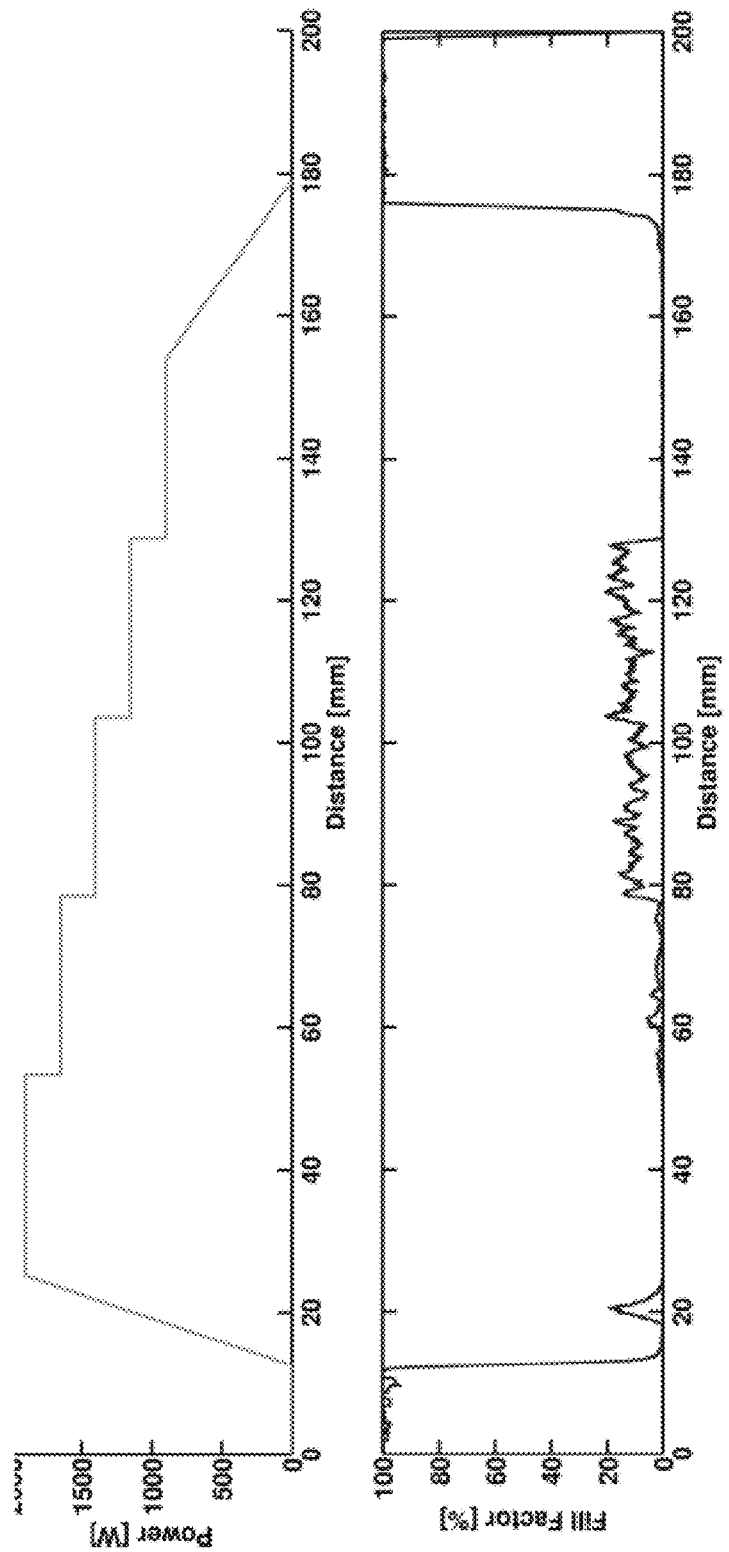
FIG. 6
FIG. 7

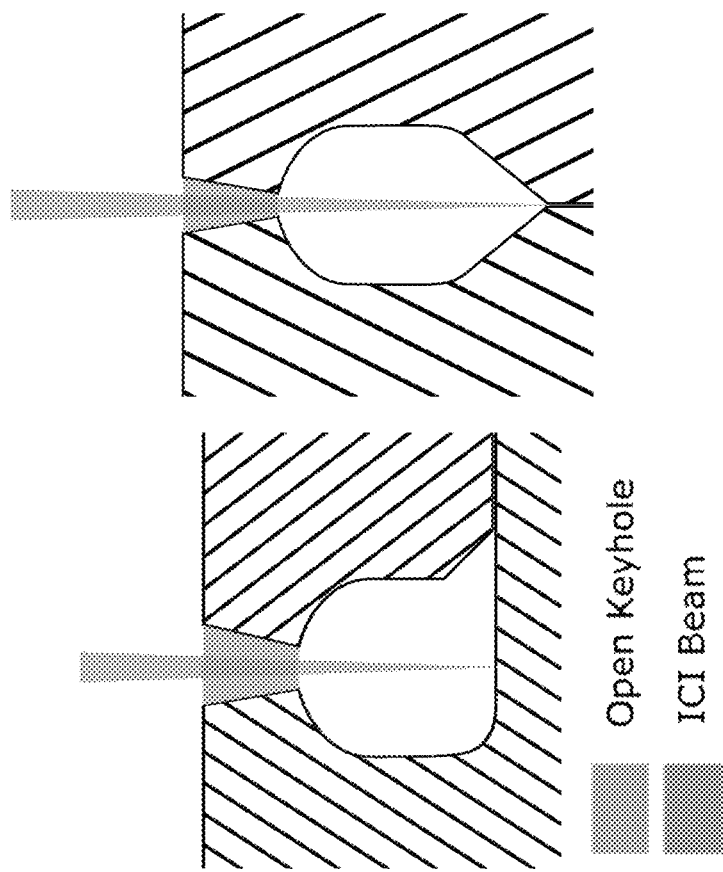

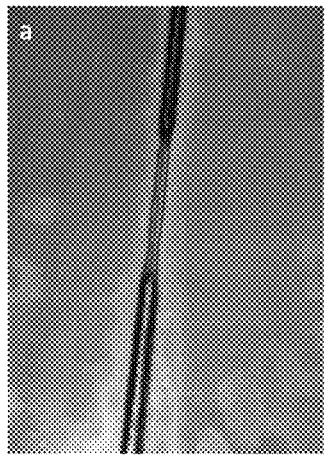 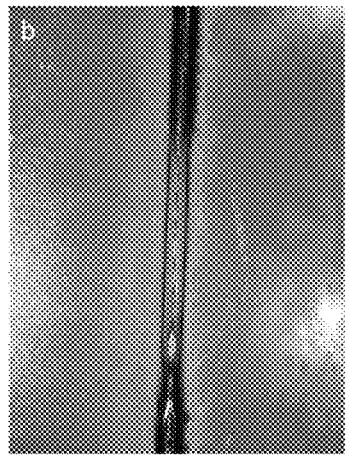 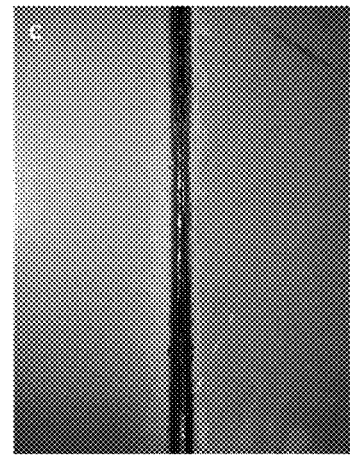
FIG. 11A  FIG. 11B  FIG. 11C
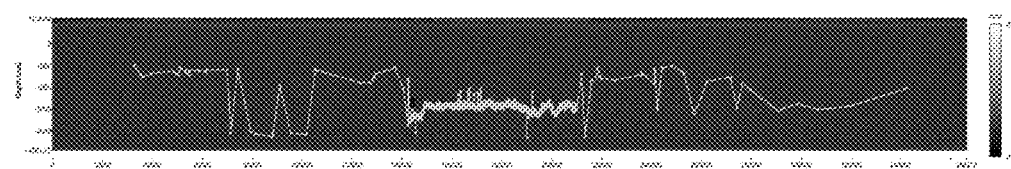
FIG. 12A
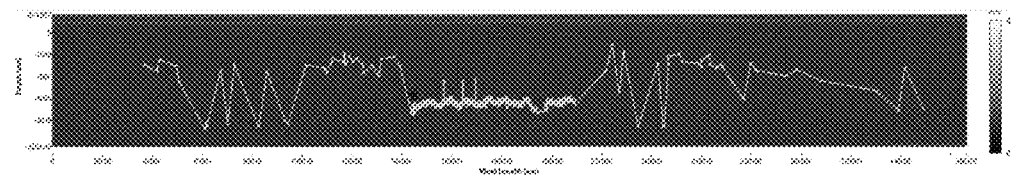
FIG. 12B
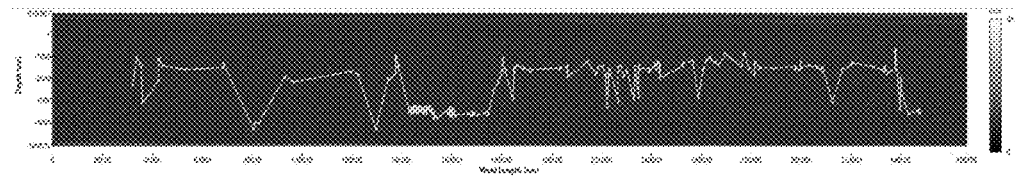
FIG. 12C

MONITORING MATERIAL PROCESSING USING IMAGING SIGNAL DENSITY DETERMINED FROM INLINE COHERENT IMAGING (ICI)

RELATED APPLICATIONS

The present application is a continuation of U.S. patent application Ser. No. 16/721,306, now U.S. Pat. No. 11,458, 566 issued Oct. 4, 2022, which claims the benefit of U.S. Provisional Application Ser. No. 62/782,071 filed Dec. 19, 2018, all of which are fully incorporated herein by reference.

TECHNICAL FIELD

The present disclosure relates to monitoring material processing and more particularly, to monitoring material processing using imaging signal density determined from inline coherent imaging (ICI).

BACKGROUND INFORMATION

Inline coherent imaging (ICI) may be used to monitor various types of processes by detecting reflections from a workpiece inline with a process beam directed to the workpiece. ICI generally involves directing an imaging beam along with the processing beam toward a workpiece and using an interferometer to receive reflections of the imaging beam and produce an output indicative of characteristics of the process and/or workpiece, such as welding keyhole depth. Examples of ICI are described in greater detail in U.S. Pat. Nos. 8,822,875, 9,757,817 and 10,124,410, which are commonly-owned and fully incorporated herein by reference.

Laser welding is one example of a process that may be effectively monitored with ICI. Laser welds of all types often contain defects due to process parameters being out of tolerance, variations in input feedstock, or natural fluctuations or instabilities in the melt pool and vapor channel or keyhole. Direct measurement of keyhole or vapor channel penetration is very important for defect detection, and ICI is the first industrially-viable technology to accomplish this. ICI is very effective for detection of defects in blind/partial penetration vapor channels but has been less effective for full-penetration weld processes. ICI is normally used to measure the optical path length to the backscattering interface (e.g., keyhole bottom), resulting in unstable data when the keyhole fully penetrates the material.

Certain laser welding techniques present unique challenges when monitoring with ICI. In a wobble welding technique, for example, the process beam is moved quickly in a wobble pattern during welding. When monitoring wobble welding with ICI, aligning an imaging beam with the keyhole, phase change region (PCR) or other workpiece sub-region presents challenges because the process beam is moving in a wobble pattern.

SUMMARY

Consistent with one aspect of the present disclosure, a method comprises: generating a process beam and directing the process beam to a workpiece for material processing; generating an imaging beam; directing the imaging beam to the workpiece; producing an interferometry output from at least a component of the imaging beam reflected from the workpiece; producing a plurality of A-scans of the workpiece using the interferometry output; and classifying A-scans of the plurality of A-scans as pertaining to at least one aspect of a phase change region or workpiece sub-region.

Consistent with another aspect of the present disclosure, a method comprises: producing a plurality of A-scans of a workpiece using inline coherent imaging (ICI), wherein the A-scans are spaced by distance or time; and classifying A-scans as pertaining to at least one aspect of a phase change region or workpiece sub-region.

Consistent with a further aspect of the present disclosure, a system comprises a material processing system configured to generate a process beam and to direct the process beam toward a workpiece and an inline coherent imaging (ICI) system configured to generate an imaging beam, to direct the imaging beam toward the workpiece together with the process beam, to produce an interferometer output from a reflection of the imaging beam, and to detect the interferometer output to produce ICI data. The system also comprises a monitoring system programmed to receive the ICI data and to determine at least an ICI imaging signal density, and classify at least one aspect of a phase change region or workpiece sub-region using the imaging signal density.

BRIEF DESCRIPTION OF THE DRAWINGS

These and other features and advantages will be better understood by reading the following detailed description, taken together with the drawings wherein:

FIG. 2A is a flow chart of a method for monitoring material processing using imaging signal density, consistent with embodiments of the present disclosure.

FIG. 2B is a flow chart of a method for determining imaging signal density, consistent with embodiments of the present disclosure.

FIGS. 5A-5E are illustrations of a part that can be butt welded with a laser and monitored using imaging signal density, consistent with an embodiment of the present disclosure.

FIG. 6 is an image showing raw ICI data indicating depth as a function of weld length for a part that has been laser butt welded, consistent with an embodiment of the present disclosure.

FIG. 7 illustrates graphs of welding laser power and imaging signal fill factor (density) as a function of distance (weld length), consistent with an embodiment of the present disclosure.

FIGS. 10A and 10B are schematic illustrations of weld penetration in other part geometries having subsurface pockets, which may be monitored using imaging signal density, consistent with embodiments of the present disclosure.

FIGS. 11A-11C are images of the weld root of butt welds performed using different laser powers, which may be monitored using imaging signal density, consistent with embodiments of the present disclosure.

FIGS. 12A-12C are plots of ICI keyhole measurements of the butt welds shown in FIGS. 11A-11C as a function of weld length.

DETAILED DESCRIPTION

Figure 1:
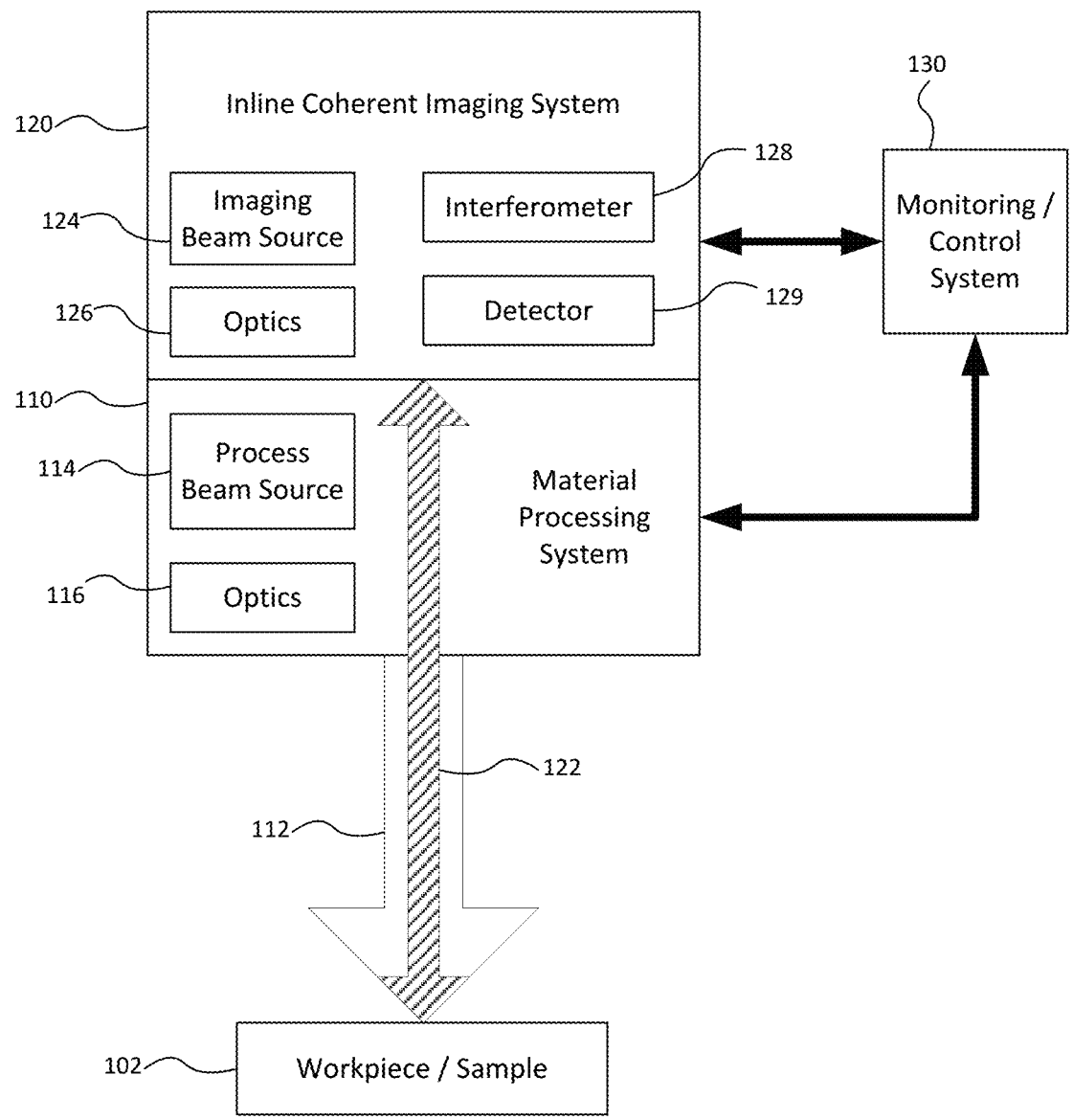
FIG. 1 is a schematic diagram of a material processing system with an inline coherent imaging (ICI) system capable of monitoring material processing using imaging signal density, consistent with embodiments of the present disclosure.

Systems, methods and apparatuses, consistent with the present disclosure, are used for monitoring material processing using imaging signal density calculated for an imaging beam directed to a workpiece or processing region, for example, during inline coherent imaging (ICI). The imaging signal density may be used, for example, to monitor laser and e-beam welding processes such as full or partial penetration welding performed using pulsed welding, spot welding and/or wobble welding. In some examples, the imaging signal density is indicative of weld penetration as a result of reflections from a keyhole floor and/or from a subsurface structure beneath the keyhole. The monitoring may include automated pass/fail or quality assessment of the welding or material processing or parts produced thereby. The imaging signal density may also be used to control the welding or material processing and/or the monitoring, for example, using an imaging signal density data output as feedback. The imaging signal density may be used alone or together with other measurements or metrics, such as distance or depth measurements.

As used herein, inline coherent imaging (ICI) refers to a process where an imaging beam is directed to a workpiece together or "inline" with a process beam for purposes of measuring characteristics of the process and/or workpiece. The term "inline" does not require the imaging and process beams to be co-axial. The imaging beam may be co-axial with the process beam or may be offset or angled relative to the process beam. As used herein, the term "wobble welding" refers to a welding process where a process beam is moved with a relatively small reciprocating movement ("wobble") as the process beam is translated across the weld site (e.g., by moving the workpiece and/or beam delivery system).

As used herein, signal density (also referred to as fill factor) refers to a percentage of measurements showing the signal above a signal intensity threshold (e.g., in dB). The ICI signal density may be determined, for example, by producing a plurality of axial scans or A-scans of a workpiece or processing region using ICI and calculating the ICI signal density by determining whether each A-scan contains a measurement point above a signal intensity threshold and calculating a percentage of A-scans satisfying this condition. The percentage may be calculated within a defined distance or time or a defined number of A-scans referred to as a signal density window or bin, as will be described in greater detail below. A plurality of A-scans may be produced respectively at a plurality of axial lines or A-lines spaced along a workpiece or may be produced at one location.

This approach recognizes that signal density from certain depth regions in a phase change region (PCR) formed during welding may be relevant for assessing the penetration or quality of a weld. For example, increasing or high signal density emanating from a region starting with the top of the workpiece and ending substantially at the known thickness of the workpiece would suggest that the keyhole or vapor channel is closing or closed. Conversely, increasing or high density signal emanating from a distance substantially deeper than the known thickness of workpiece feature being welded could indicate that the vapor channel is opening or open, revealing another feature of the workpiece, such as the bottom of a gas relief pocket, or another feature of the machine, part or assembly such as a backing plate or sacrificial material that is intentionally placed to generate a strong reflection for the ICI system and enable the methods described herein, as will be described in greater detail below.

Referring to FIG. 1, imaging signal density may be used to monitor material processing, consistent with embodiments of the present disclosure, in a material processing system 110 using an inline coherent imaging (ICI) system 120. The material processing system 110 generates and directs a process beam 112 to a workpiece 102 for processing the workpiece (e.g., welding). The inline coherent imaging (ICI) system 120 generates and directs an imaging beam 122 to the sample or workpiece 102 together or "inline" with the process beam 112 for imaging the workpiece and generating ICI data indicative of characteristics of the workpiece and/or material processing. A monitoring/control system 130 receives the ICI data from the ICI system 120 and determines the ICI imaging signal density as well as other measurements for purposes of monitoring and/or controlling the material processing.

The material processing system 110 includes a process beam source 114, such as a laser or e-beam source, for generating the process beam 112. The material processing system 110 also includes optics 116, such as collimators and/or lenses, for delivering the process beam 112 to the workpiece 102 to perform material processing. In an example embodiment, the material processing system 110 is a laser or e-beam welding system and the process beam may be used to form a vapor channel or keyhole during the welding process. An example of the material processing system 110 is a laser welding system available from IPG Photonics Corporation where the process beam source 114 includes a fiber laser. Other material processing systems are also within the scope of the present disclosure.

Another example of the material processing system 110 is a wobble-welding system where the process beam is moved quickly in a wobble pattern while being scanned across a weld site on the workpiece. In a wobble welding system, the optics 116 may also include movable mirrors or other active deflectors or scanning actuators for moving the process beam in the wobble pattern. One example of the "wobble" movement may be a reciprocating movement of a laser beam (e.g., in one or more axes) and within a relatively small field of view defined by a scan angle of less than 10° or by a maximum beam angle displacement of less than ±5°. An example of a wobble welding system is described in greater detail in U.S. Patent Application Publication No. 2016/0368089, which is commonly-owned and fully incorporated herein by reference. An example of ICI used in a wobble welding system is described in greater detail in U.S. patent application Publication No. 2020/0023461 (Ser. No. 16/515,892 filed on Jul. 18, 2019), which is commonly-owned and fully incorporated herein by reference.

The ICI system 120 includes an imaging beam source 124, such as a semi coherent light source, for generating the imaging beam 122 and optics 126, such as collimators and/or lenses, for directing the imaging beam 122 to the workpiece. The ICI system 120 also includes an interferometer 128, such as a Michelson interferometer, for producing an interferometer output from the reflected imaging beam 122 and a detector 129, such as a spectrometer and camera, for detecting the interferometer output to produce ICI data (i.e., interferogram data). The interferometry output may be based on at least one optical path length to the workpiece and at least one other optical path length. In the example embodiment, the optics 126 may deliver the imaging beam 122 into a keyhole formed during the welding process for imaging one or more locations within the keyhole. In other embodiments, the ICI system 120 may include directing elements such as movable mirrors (not shown) for directing the imaging beam 122 to different locations within the keyhole or relative to the workpiece. An example of the ICI system is an ICI weld monitoring system with Omni-WELD software available from IPG Photonics.

Embodiments described in the present disclosure may also be used with any material processing systems and ICI systems described in greater detail in U.S. Pat. Nos. 8,822,875, 9,757,817 and 10,124,410, which are commonly-owned and fully incorporated herein by reference.

The monitoring/control system 130 includes hardware (e.g., a general purpose computer) and software programmed to at least calculate the imaging signal density and other measurements from the ICI data. The monitoring/control system 130 may also record the raw ICI data and the calculated imaging signal density as well as other measurements. The monitoring/control system 130 may further monitor the process and/or workpiece during processing. The monitoring/control system 130 may monitor the ICI imaging signal density to determine characteristics of the process and/or material for purposes of inspection or quality assurance (e.g., pass/fail). The monitoring/control system 130 may also control the material processing in response to analog or digital feedback (i.e., direct data output) including the ICI imaging signal density. The monitoring/control system 130 may also determine and use other measurements or metrics including, without limitation, keyhole depth, seam profile, workpiece height, finished weld surface height, bead profile and other distance measurements. The monitoring/control system 130 may further control the monitoring using ICI including, without limitation, the position of the imaging beam relative to the process beam.

Referring to FIG. 2A, a method 210 for calculating ICI imaging signal density is shown and described in greater detail. In general, an imaging beam is generated 212 (e.g., using the imaging beam source 124 from the ICI system 120) and directed 213 to the workpiece, for example, together with a process beam. In one example of a keyhole welding process, the imaging beam may be directed into the weld keyhole as well as at other locations before and/or after the keyhole. The imaging beam may also be directed to multiple different locations inside the keyhole and before and/or after the keyhole. The imaging beam may be aligned within the keyhole or processing region to improve the measurements.

An interferometry output is produced 214 (e.g., using the interferometer 128 in the ICI system 120) from at least a component of the imaging beam reflected from the workpiece and/or processing region. The interferometry output is based on at least one optical path length to the workpiece (e.g., a sample arm) and at least one other optical path length (e.g., a reference arm). In the example of keyhole welding, the imaging beam may be backscattered from the sides of the keyhole, from a floor of the keyhole, and/or from a subsurface structure such as a shelf under the keyhole.

The interferometry output is detected 216 (e.g., using the detector 126) to produce interferometry data, such as interferogram data, and an imaging signal density is determined 218 (e.g., in the monitoring/control system 130) from the interferometry output. In the example of keyhole welding, the interferometry data and the imaging signal density are indicative of at least the depth of the keyhole and the penetration of the keyhole through the workpiece, as will be described in greater detail below. The imaging signal density may then be used to provide automated pass/fail or quality assurance of the workpiece or processing region such as the weld. Imaging signal density data may also be output directly to the material processing system 110 to provide feedback control of the material processing. Additionally or alternatively, imaging signal density may be fed back to the monitoring system 130, for example, to adjust monitoring position or a location of the imaging beam relative to the process beam or workpiece.

Referring to FIG. 2B, a method 220 for determining the imaging signal density is shown and described in greater detail. According to this embodiment of the method, a plurality of A-scans of a workpiece are produced 222 using ICI at a respective plurality of A-lines spaced across the processing region of the workpiece or spaced in time. In the example of keyhole welding, a series of A-scans may be made along a length of the weld as the process beam performs the welding.

An ICI signal density is calculated 224 by determining whether each of a plurality of A-scans contains a measurement point above a signal intensity threshold (e.g., in dB) and calculating a percentage of A-scans satisfying this condition within a bin or window of A-scans over a defined distance or time. Signal density may be calculated for multiple signal density bins positioned along a processing region to represent imaging signal density as a function of position along the processing region. In the example of keyhole welding, this percentage of measurements made within a specific region (i.e., within the bin or window) of all total possible measurements in the region represents the keyhole signal density as a function of weld length. The signal intensity threshold (also referred to as the measurement or tracking threshold) and/or the signal density bin size may be user defined. Different algorithms may be used to calculate the imaging signal density with different arrangements of the signal density bins or windows along the processing region, for example, along a length of the weld, as will be described in greater detail below. The imaging signal density calculations may also be smoothed using known smoothing algorithms such as moving means, medians, or quantile filters.

Figure 3A:
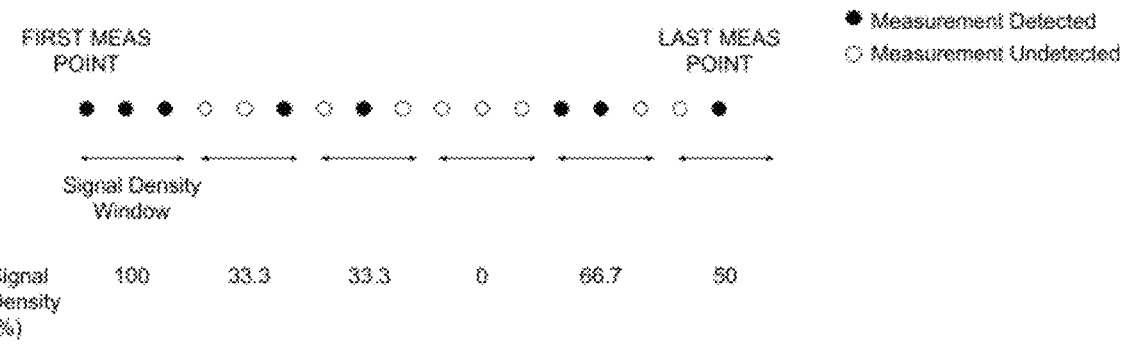
FIGS. 3A-3C are diagrams illustrating different signal density algorithms for determining imaging signal density, consistent with embodiments of the present disclosure.
Figure 3B:
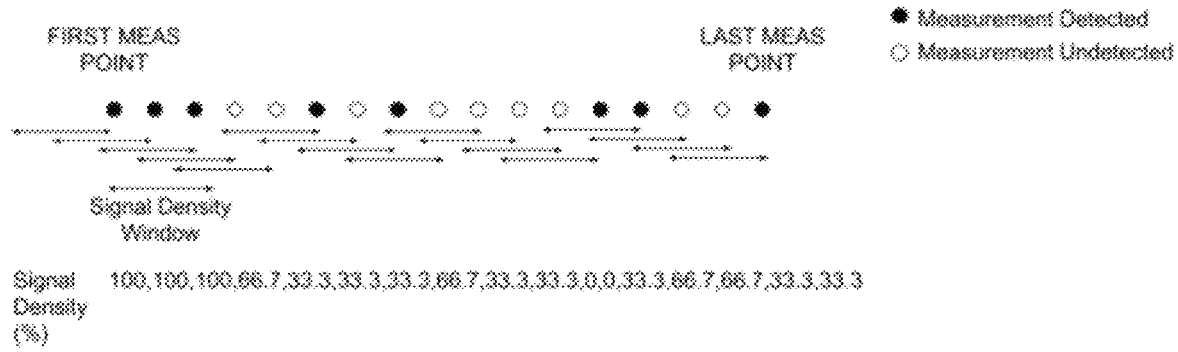
Figure 3C:
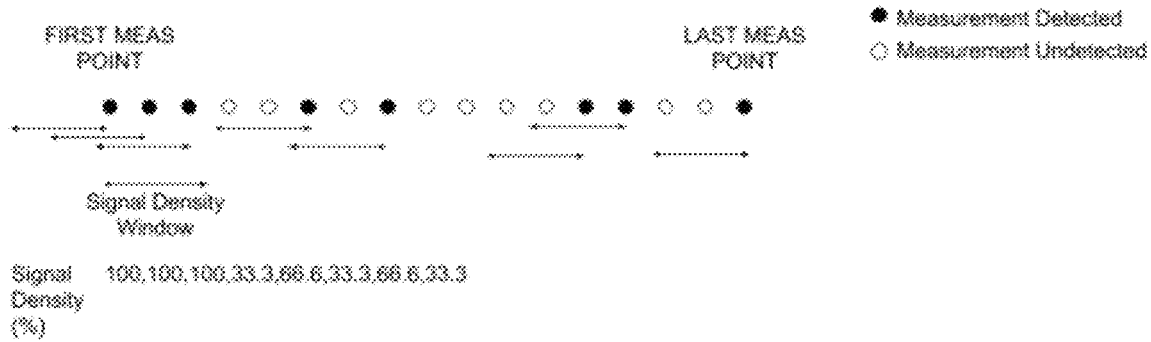

Referring to FIGS. 3A-3C, example algorithms for calculating imaging signal density using signal density bins or windows are described in greater detail. FIGS. 3A-3C show different algorithms with different arrangements of signal density bins or windows across the length of a processing region such as the length of a weld. Each signal density window or bin includes a fixed length (e.g., 5 μm) or fixed time containing a fixed number of A-line measurement points (i.e., A scans), which occur with a uniform sample spacing across the processing region. To calculate the imaging signal density, the number of detected measurements (i.e., measurements above the threshold in dB) within a window are divided by the total possible number of measurements within the window and multiplied by 100%.

In the illustrated examples, each window includes three (3) measurement points or A-scans for purposes of simplicity; however, a signal density window or bin may include other numbers of measurement points and the window length may be defined by the user. If a measurement is detected for all three (3) measurement points or A-scans, the signal density within that window or bin is 100%. If a measurement is detected for one (1) out of three (3) measurement points, the signal density within that window or bin is 33%. These calculated percentages may then be plotted as a function of position along the processing region.

In FIG. 3A, the signal density algorithm uses fixed windows that are positioned end-to-end (i.e., not overlapped) across the length of the processing region. In the illustrated example, after every three (3) measurement points, the signal density is calculated based on the previous three (3) measurement points (i.e., within a window extending backwards). Using this algorithm, the signal density window length may be set as a multiple of the sample spacing along the processing region such that each of the windows will have a consistent number of total possible measurement points within each of the windows. According to this algorithm, the percentages may then be plotted as the y value with the window start position along the processing region as the x value of the measurement.

In FIGS. 3B and 3C, the signal density algorithms arrange the signal density windows such that each of the signal density windows has a uniform number of total possible measurements. In the signal density algorithm shown in FIG. 3B, the signal density is calculated at each measurement point (i.e., each location where a measurement is taken whether detected or undetected). In the illustrated example, at every measurement point, the signal density is calculated based on the previous three (3) measurement points (i.e., within a window extending backwards). In the signal density algorithm shown in FIG. 3C, the signal density is calculated at each tracked measurement location (i.e., each location with a detected measurement above the threshold). In the illustrated example, at every measurement point where a measurement is detected above the threshold, the signal density is calculated based on the previous three (3) measurement points (i.e., within a window extending backwards). This example in FIG. 3C results in fewer signal density calculations as well as signal density windows with a uniform number of total measurements. Although these configurations show the window extending backwards, the window can also be centered on the measurement point, extend forward, or have other configurations.

In some embodiments, the ICI signal density is calculated using multiple different intensity threshold levels. The signal density calculation associated with each threshold may be used individually, or in aggregate, to allow more specific detection of process phenomena. For example, in certain full penetration keyhole welding applications, a "good" weld may have a signal density measurement within a specific percentage range (e.g., 10-20%) using one threshold level (e.g., 15 dB) and a signal density measurement within another specific percentage range (e.g., 5-8%) using another threshold level (e.g., 20 dB).

In some embodiments, ICI signal density is calculated using dynamic intensity threshold levels. Dynamic intensity threshold levels may be specified as a function of weld path position or as a function of acquisition time. The user may configure custom dynamic limits according to specific knowledge about the process conditions. In some embodiments, the intensity threshold level may be modified according to the DC (0-delay) signal level of the A-line itself. In other embodiments, the intensity threshold level may be modified according to the interface intensity measured from another region on the workpiece. In further embodiments, the intensity threshold level may be modified according to interface intensity measured prior to processing. Such dynamic limits may be used to compensate for changes in process conditions (e.g., changes in workpiece geometry, material type, beam energy, feedrate, workpiece surface contamination, etc.) or for changes in processing equipment (e.g., coverglass contamination).

In other embodiments, the region over which to consider signal density may be narrowed down using other measurements such as, for example, upper/lower keyhole depth or keyhole signal intensity. For example, the ICI signal density may be calculated for multiple different A-line depth bands. The ICI signal density within each depth band may be used individually, or in aggregate, to allow more specific detection of process phenomena. In certain full penetration keyhole welding applications, for example, a "good" weld may be required to have a signal density measurement within a specific percentage range near the subsurface of the material (i.e., keyhole shoulder depth) and a signal density within another specific range near the bottom surface of the material. In some embodiments, a depth band region may be set specifically to measure DC (0-delay) intensity levels.

The imaging signal density may be used in quality assurance algorithms to make pass/fail determinations in welds, as will be described in greater detail below. An imaging signal density exceeding a defined density limit or threshold for a defined distance or period of time, for example, may indicate partial penetration or loss of penetration resulting in a failed weld. In other embodiments, a quality assurance algorithm may determine pass/fail based on the imaging signal density being within a defined range with upper and lower bounds.

In other embodiments, the imaging signal density may be used to monitor system (ICI system or material processing system) health. Signal density measured from the workpiece surface, from specific locations within the material processing system, or from specific locations within the ICI system, may be used to measure degradation of, or damage to, system components. Degradation or damage to material processing system components (e.g., coverglass, focusing optic, etc.) and ICI system components (e.g., delivery fiber, interferometer optics, etc.) result in a decline in imaging beam transmission or reflection at specific stages of the optical path and may be detected by a drop in ICI signal density over time.

In further embodiments, ICI signal density may be used to monitor the health of a processing cell. Signal density measurements of specific parts of the cell (e.g., clamping, fixturing, equipment, machinery, etc.) may be used to indicate damage or contamination.

In some embodiments, A-line averaging, smoothing, or other aggregation operation may be performed prior to calculating signal density. Such operations may be used to make signal density measurements more robust to speckle or process instabilities. In some embodiments, the ICI system beam delivery optics may include specific optics, such as a diffuser, to reduce speckle.

Figures 4A, 4B:
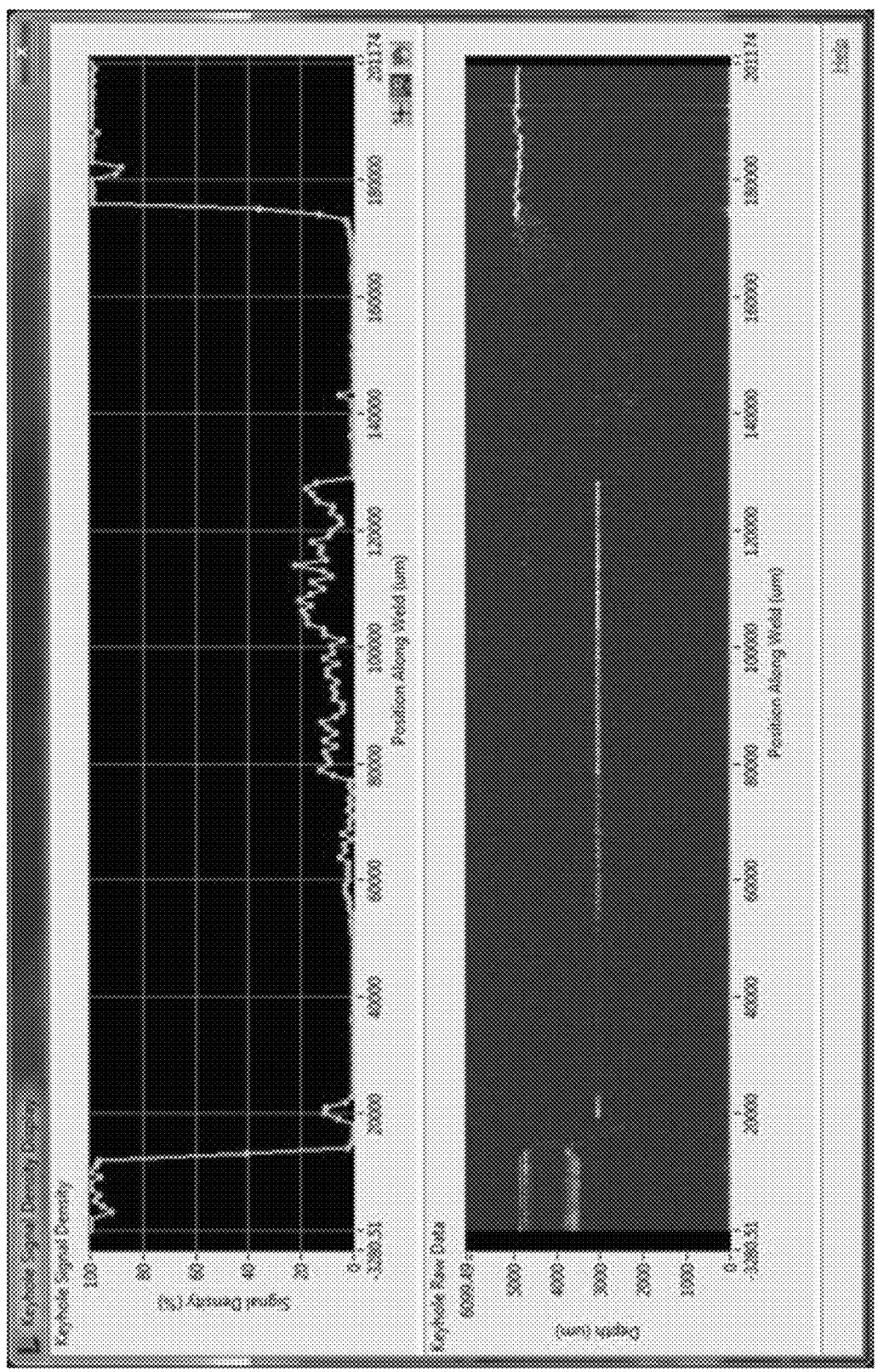
FIG. 4A is an image showing a plot of keyhole signal density as a function of position along a weld, consistent with an embodiment of the present disclosure.
FIG. 4B is an image showing a plot of keyhole raw data for a series of A scans at a plurality of A-lines along a weld, which indicates keyhole depth as a function of position along the weld, consistent with an embodiment of the present disclosure.

Referring to FIGS. 4A and 4B, both the calculated signal densities along the processing region and the ICI raw data may be stored and displayed by plotting as a function of position along the processing region, for example, along the weld. FIG. 4A shows an example of keyhole signal density as a function of position along a weld during a keyhole welding process. FIG. 4B shows keyhole raw data indicating keyhole depth as a function of position along the weld. As illustrated, the imaging signal density is higher at the beginning and end of the weld where the imaging beam reflects from the top surface of the workpiece before the keyhole opens and after the keyhole closes. The imaging signal density decreases as the keyhole depth increases to full penetration and then increases again after full penetration when the imaging beam reflects from a subsurface shelf (shown as a brighter signal in the raw data). In this example, these plots may be used for purposes of monitoring the weld and welding process. The plot of signal density in FIG. 4A, for example, may be used to perform quality assurance and determine failure points and the plot of keyhole raw data in FIG. 4B may be used to ensure that the keyhole signal density plot is as expected.

Referring to FIGS. 5A-5B, systems and methods described herein may be used to monitor weld penetration in a butt weld application where the part has a subsurface shelf along the process axis and below the welding region. As shown in FIG. 5A, the weld is through a press-fit butt joint and the process beam and imaging beam are directed toward a weld region on the part 502 (as shown by the arrow). FIG. 5B shows the part 502 and weld region 503 before any keyhole formation at a process beam power of 0 W. The part forms a void 505 and a subsurface shelf 506 below the weld region 503 (e.g., at about 8 mm below the top surface). FIG. 5C shows a keyhole 508 with full penetration at a process beam power of 1150-1900 W. In this case, the keyhole 508 exposes the shelf 506 such that an imaging beam passes through the keyhole 508 and reflects from the shelf 506 back through the keyhole 508. FIG. 5D shows the keyhole 508 with partial penetration at a reduced process beam power of 900 W. In this case, the keyhole 508 is closed and the imaging beam 522 is reflected from a bottom 509 of the keyhole 508.

FIG. 5E illustrates how ICI may be used to monitor full penetration in this butt weld application. An ICI system has a standard field of view (e.g., about 12 mm total) used for typical keyhole weld monitoring. The full ICI field of view folds over onto itself, however, such that any surfaces in the lower half appear overlapped with those above them. This double field may be used to resolve reflections from the shelf 506 below the weld path along the process axis. The full penetration of the keyhole 508 thus provides a clear path for the imaging beam and allows the lower surfaces to be imaged and to appear in the ICI data (within the double field overlapped onto the standard field).

Referring to FIGS. 6-9, ICI data may be used to calculate signal density and to perform a quality assurance algorithm to pass or fail the butt weld based on full penetration, partial penetration, over penetration, and/or loss of penetration of the weld. FIG. 6 shows raw ICI data produced along the weld length of the weld for different laser powers and representing different penetration conditions during the weld. In this example, the laser was controlled to ramp up the power from 0 to 1900 W for 200 ms, to provide power steps at 1900 W for 450 ms, 1650 W for 400 ms, 1400 W for 400 ms, 1150 W for 400 ms, 900 W for 400 ms and then to ramp down to 0 W for 400 ms. FIG. 6 also shows the desired pass/fail outcomes of a weld quality assurance algorithm. The arrows indicate where the raw data shows the lower shelf surface after keyhole penetration and the keyhole bottom after loss of penetration. A distinct change in the shelf signal is visible when the power changes.

This change in the shelf signal may be quantified by calculating imaging signal density as described above. FIG. 7 shows the signal density (also referred to as fill factor) as a function of distance along the weld together with the laser power as a function of distance along the weld. In this example, the signal density (or fill factor) is the moving percentage of measurements above an intensity threshold of 12 dB. The changes in signal density can be seen with each power step and the values of ~100% signal density are seen before and after the weld where the imaging beam measures solid material on the top surface of the part.

Figure 8A:
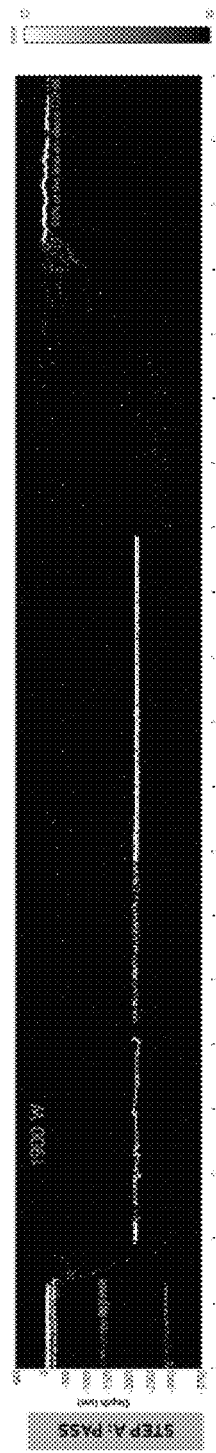
FIGS. 8A-8E are images showing raw ICI data indicating depth as a function of weld length evaluated using only imaging signal density (or fill factor) for purposes of pass/fail quality assurance, consistent with an embodiment of the present disclosure.
Figure 8B:
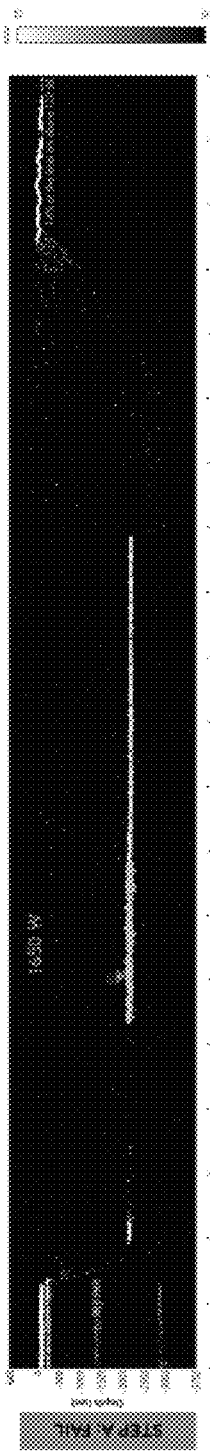
Figure 8C:
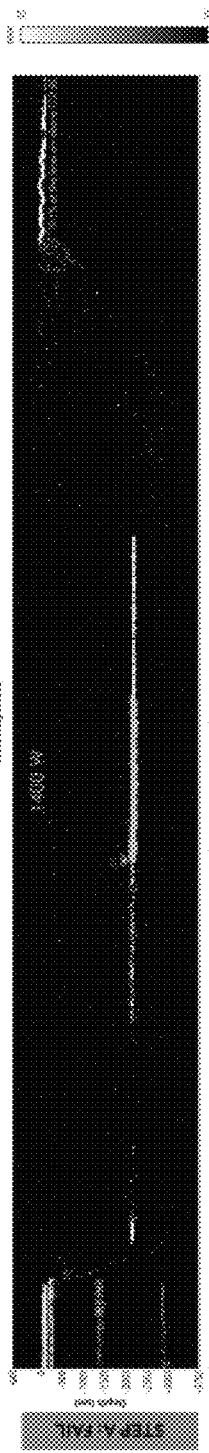
Figure 8D:
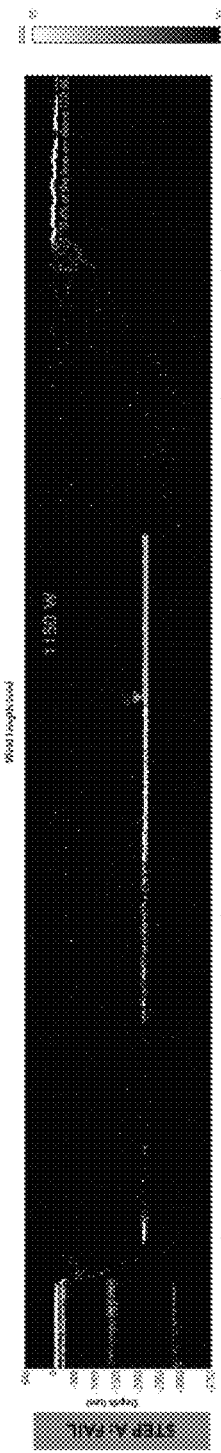
Figure 8E:
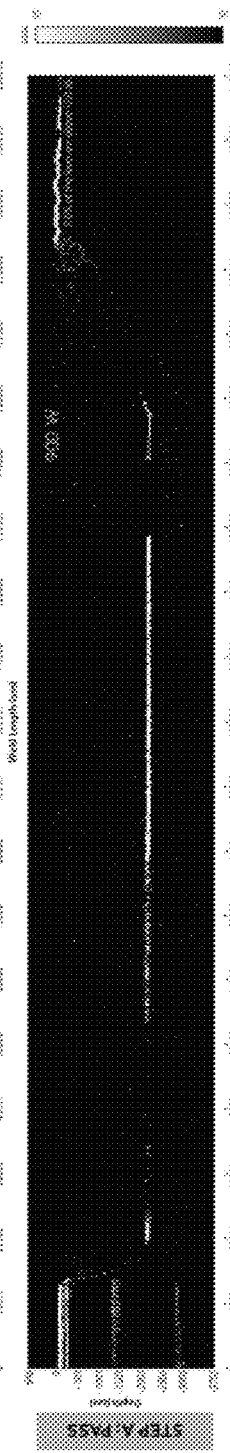

FIGS. 8A-8E illustrate the results of a quality assurance algorithm based on the signal density (fill factor). In this example, the quality assurance algorithm fails the weld if the signal density stays above a certain percentage (e.g., 10%) over a certain characteristic distance (e.g., 1-2 mm) and around a narrow depth band (e.g., 200 µm) around the shelf signal. FIG. 8A shows that the weld correctly passes where the power is 1900 W and signal density within the narrow depth band indicates that full penetration is achieved. FIGS. 8B-8D show that the weld correctly fails because signal density within the narrow depth band is too high indicating that the power is too low. In this case, the high signal density indicates that power is too low because the lower power results in less disruption on the shelf and more reflection from the shelf. FIG. 8E shows that the weld incorrectly passes because the signal density stays below the threshold as a result of the partially penetrated keyhole signal not being dense enough to distinguish itself from the weak shelf signal observed at the correct process conditions (FIG. 8A).

Figure 9:
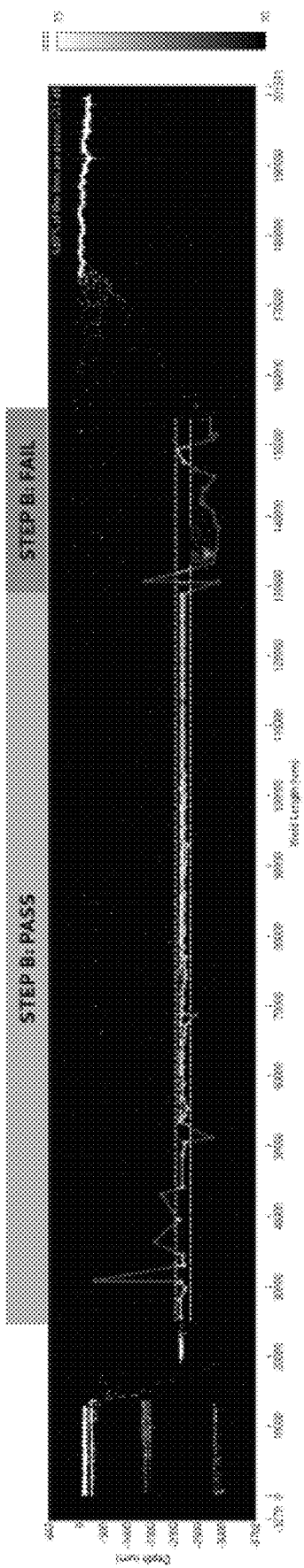
FIG. 9 is an image showing raw ICI data indicating depth as a function of weld length evaluated using imaging signal density (or fill factor) and distance measurements for purposes of pass/fail quality assurance, consistent with an embodiment of the present disclosure.

Other measurements may be used to correctly fail the weld under the conditions shown in FIG. 8E. In particular, a quality assurance algorithm may use the maximum signal density as discussed above together with a distance measurement such as maximum consecutive distance out of bounds to pass or fail a weld. As shown in FIG. 9, for example, the weld should fail (under the conditions shown in FIG. 8E) as a result of a 4 mm consecutive measured distance out of bounds or outside of the 200 µm narrow depth band between 2050 µm and 2250 µm around the location of the shelf signal. The out of bounds measurement points in the 1900 W region (under the conditions shown in FIG. 8A) are not enough to cause a failure and thus the weld under these conditions would still correctly pass using this quality assurance algorithm. An automated quality assurance algorithm may thus apply a logical "OR" operation to the maximum signal density and maximum distance measurements discussed above to fail a weld. Minimum signal density may also be used in certain applications.

FIGS. 10A and 10B illustrate other part geometries where ICI and imaging signal density may be used to monitor weld penetration during a butt weld application. The part geometry in FIG. 10A defines a subsurface pocket with a flat pocket floor that reflects most of the imaging beam back to the ICI system when the keyhole is open. The part geometry in FIG. 10B defines a subsurface pocket with a pocket floor containing a V-groove ending in a butt joint centered directly along the process axis, which scatters light within the pocket and returns less of the imaging beam back to the ICI system when the keyhole is open. Even with this geometry and the relatively weak signal returned from the pocket floor, imaging signal density may be used to monitor weld penetration.

In some embodiments, the part geometry may be modified or engineered to improve subsurface reflection. Where there is a subsurface structure with a geometry that does not provide good reflectivity (e.g., as shown in FIG. 10B), the subsurface structure may be modified to improve reflectivity. A polymer layer or other coating may be used on the pocket floor, for example, to improve reflectivity of a subsurface structure and thus increases the strength of the signal returned from the pocket floor. The layer and/or coating may be designed to be consumed, evaporated, or otherwise removed by the process beam during the process (e.g., during full penetration). Where there is no subsurface structure along the process axis, the part geometry may be modified or engineered to create a subsurface structure capable of reflecting the imaging beam passing through a keyhole.

When a backing plate or sacrificial material is intentionally placed to generate a strong reflection for the ICI system, it is particularly beneficial if such a material or backing plate can be easily renewed, replaced or cleaned, resists the laser or e-beam energy and/or resists the adhesion of spatter. One example of this is to flow water over or under a copper surface. In this embodiment, the water and copper surfaces can be imaged by the ICI system to confirm that the weld is fully penetrated. In another embodiment, the copper surface is omitted altogether and the ICI system images a jet of water, mist (or some other fluid) passing underneath the weld joint. If an optical scattering media (such as entrained gas including steam) is present in the fluid jet, it would create multiple scattering events for the ICI image which would be very easy to distinguish from other signals, further enabling the user to confirm that light was able to pass through the joint of the workpiece and that full penetration of the weld was probable. By changing the integration time of the ICI system (to modulate the system's sensitivity to high speed motion artifact), and/or by applying Doppler or speckle variance techniques known to those skilled in the art of optical coherence tomography, the scattering medium can be further identified by showing its velocity is within a certain range that is inconsistent with motion from other aspects of the process (vapor channel, spatter etc.). The application of an image processor synchronized with the modulation of the ICI integration time such that differential comparison could be made between measurements acquired with different integration durations is particularly beneficial.

In some embodiments, the fluid comprises or contains a substance that emits (e.g. fluoresces) when radiated with the process energy beam, or another optical beam that is delivered together with the process beam, and the beam delivery system (e.g., including a delivery fiber) and/or laser are configured (e.g., by way of optimized optical coatings known to those of ordinary skill in the art) to receive that emission to confirm that full penetration of the weld has occurred. According to an embodiment, auxiliary optical sensors may be used to receive this emission. An example of an ICI system with auxiliary sensors is disclosed in greater detail in PCT/US2018/014218, which is commonly owned and fully incorporated herein by reference. The receipt and recognition of this emission may be challenged by other emissions from the process itself including blackbody radiation from the hot workpiece. In order to overcome this, the detection of this signal could be isolated to the specific wavelength of the emission (e.g. a fluorescent line) by way of optical filters and/or isolating it in time by pulsing the excitation source (at rates of several kHz or even MHz) and comparing the measured signal during the pulse to signals measured other times. If the pulsing frequency is sufficiently different from the speed at which the background noise changes, it becomes much easier to identify the true signal and identify full penetration through the weld. These concepts could also be applied to other material processing applications such as drilling or cutting to show when full penetration of a substantially opaque material has occurred.

Referring to FIGS. 11A-11C, systems and methods described herein may be used to monitor weld penetration in a butt weld without any subsurface structure along the process axis below the welding region. In this example, the imaging signal density may be used to distinguish between full-penetration and marginal loss of penetration. FIGS. 11A-11C show images of a weld root where the laser power is dropped from 9.6 kW to different laser powers of 6.0 kW, 7.0 kW and 8.0 kW, respectively. The weld root is visible in FIG. 11A and sporadically visible in FIG. 11B, but fusion is continuous throughout the weld in FIG. 11C with only some thinning of the root. In this example, the welds in FIGS. 11A and 11B should fail and the weld in FIG. 11C should pass.

Figure 13:
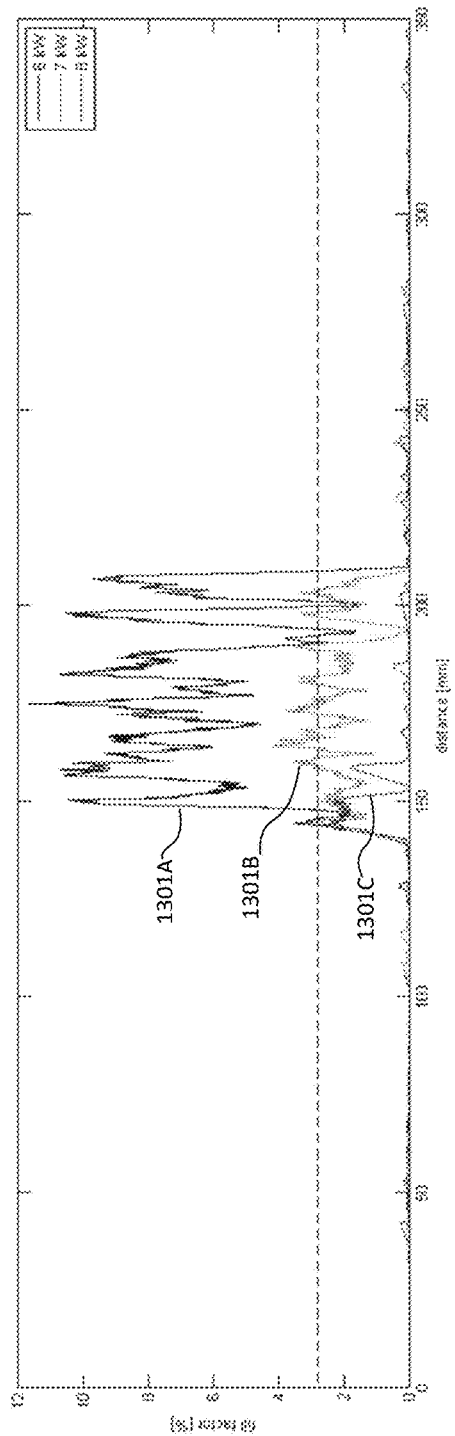
FIG. 13 is a plot showing fill factor (or imaging signal density) for the welds shown in FIGS. 11A-11C as a function of distance along the weld.

FIGS. 12A-12C show ICI keyhole measurements as a function of distance for each of the welds shown in FIGS. 11A-11C, respectively. Each of these plots indicate some keyhole closure at the start of the region where the power is dropped as shown by the increased density of points in this region. FIG. 13 shows imaging signal density as a function of distance for the three welds shown in FIGS. 11A-11C on a single plot—signal density 1301A for the weld at 6.0 kW, signal density 1301B for the weld at 7.0 kW, and signal density 1301C for the weld at 8.0 kW. In this example, the measurement or tracking threshold is 17 dB and welds for which the imaging signal density exceeds 2.8% (as indicated by the dashed line) for more than 2 mm are failed. This plot of imaging signal density helps to illustrate the pass/fail determination by distinguishing more clearly between the passed weld below the imaging signal density (i.e., the weld in FIG. 11C) and the failed welds above the imaging signal density (i.e., the welds in FIGS. 11A and 11B).

Figure 14:
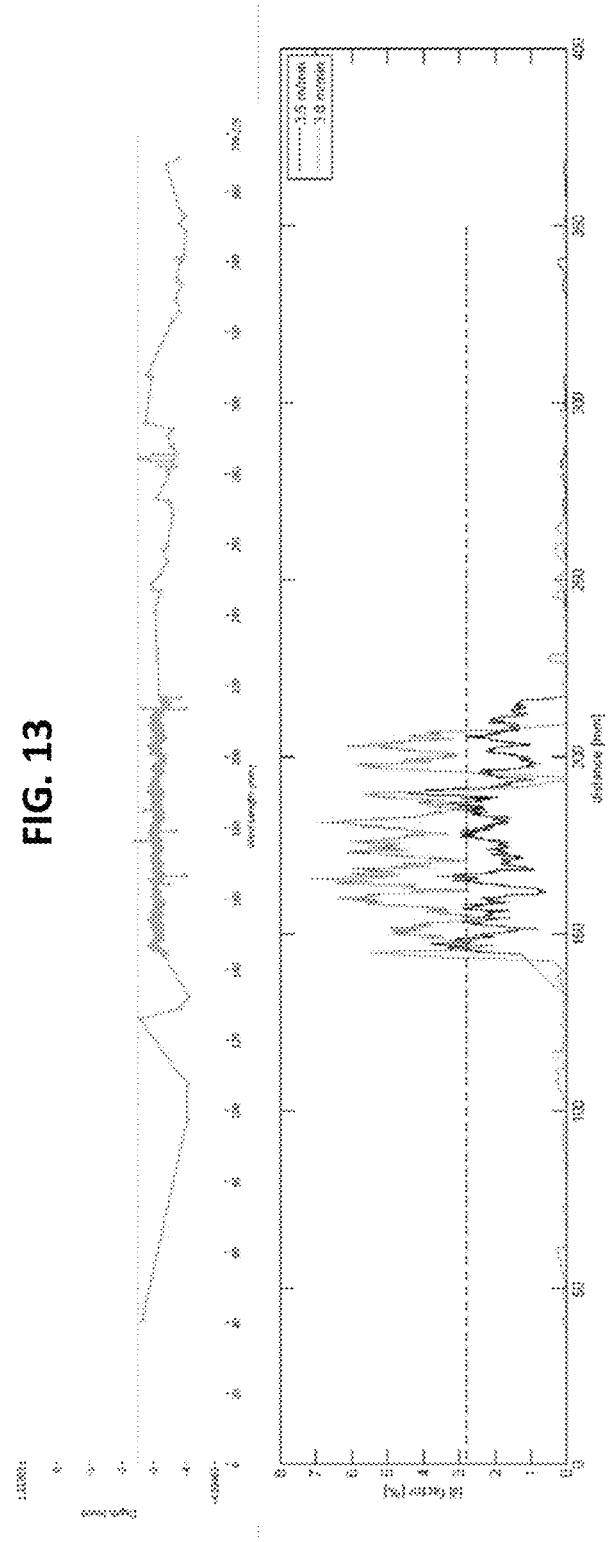
FIG. 14 is a plot showing ICI keyhole measurements (top) and imaging signal density for a lower speed butt weld.

FIG. 14 shows both the ICI keyhole measurement (top) and the imaging signal density (bottom) for a weld where the power is dropped from 9.6 kW to 6.0 kW and at speeds of 3.8 m/min and 3.5 m/min. In this example, the measurement or tracking threshold was 14 dB. As shown, the imaging signal density plotted as a function of distance shows that the reduction in speed makes the difference between the weld passing and failing. Imaging signal density may be used to make changes to one or more process parameters, such as welding speed, power, defocus and lateral process beam offset, to change the geometry of the weld keyhole. The ICI measurement settings, such as the measurement threshold, the signal density limit, and the keyhole measurement position, may also be adjusted to ensure that a quality assurance algorithm provides the desired pass/fail results for a particular application.

Referring to FIGS. 15A-15D, a further embodiment of the system and method for monitoring material processing using imaging signal density may be used to monitor a wobble welding process, such as a battery tab laser welding process. This type of process is common in electric mobility (e-mobility) applications such as battery pack assembly and is often used to join conductive metals, including copper and aluminum, in various configurations. Additional metals, such as steel and other ferrous alloys, or metal coatings, such as nickel, are also common in such processes. Prismatic, pouch, and cylindrical cells are non-limiting examples of battery pack assembly constituents. E-mobility welding applications commonly employ wobble-welding techniques with single mode lasers to improve weldability of the highly reflective metals involved in the process.

In this application, the wobble pattern results in periodic spatial variation in alignment between the imaging beam measurement location and the phase change region (PCR) position. The wobble pattern may also produce periodic temporal variations in the PCR, due to changes in linear energy density around the wobble pattern, resulting in periodic creation and collapse of the keyhole vapor channel. As a result of these variations, a series of A-scans obtained for a given imaging beam position can include those that correspond to the vapor channel and those that correspond to its proximal surface (e.g., the melt pool or workpiece surface). The classification of individual A-scans into their corresponding categories (e.g., PCR, vapor channel, workpiece surface, melt pool, etc.) is beneficial to improving the accuracy of the measurement system.

Figure 15A:
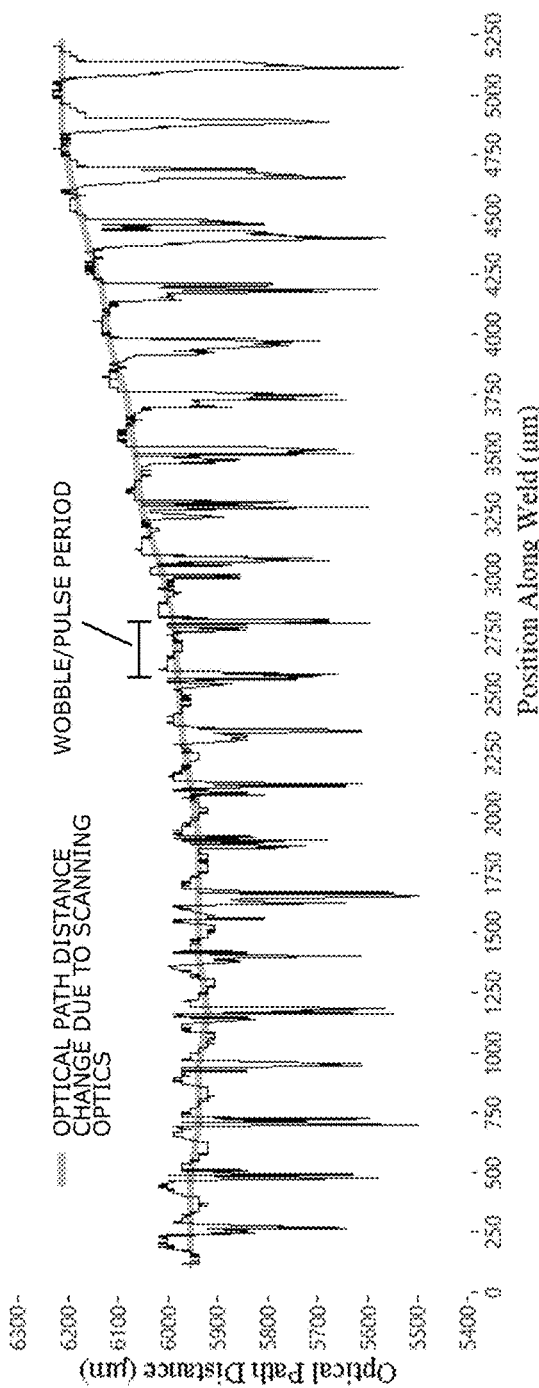
FIG. 15A is a plot of depth tracked A-scan measurements as a function of weld length for a battery tab wobble welding process where keyhole alignment to the imaging beam position varies periodically according to the wobble welding pattern.

Precise temporospatial synchronization with the wobble pattern, or more specifically the PCR position, may be infeasible. Classification of A-scans into the categories or types described above therefore relies on information included in the measurement itself. Imaging signal density can be used to perform such classification. FIG. 15A illustrates A-scan data (i.e., optical path distance) along the weld, and FIGS. 15B-15D illustrate the use of imaging signal density and static threshold levels to classify A-scan data from FIG. 15A as "keyhole" depth or "surface." More complex thresholding and signal analysis techniques may also be employed to improve classification accuracy.

Figure 15B:
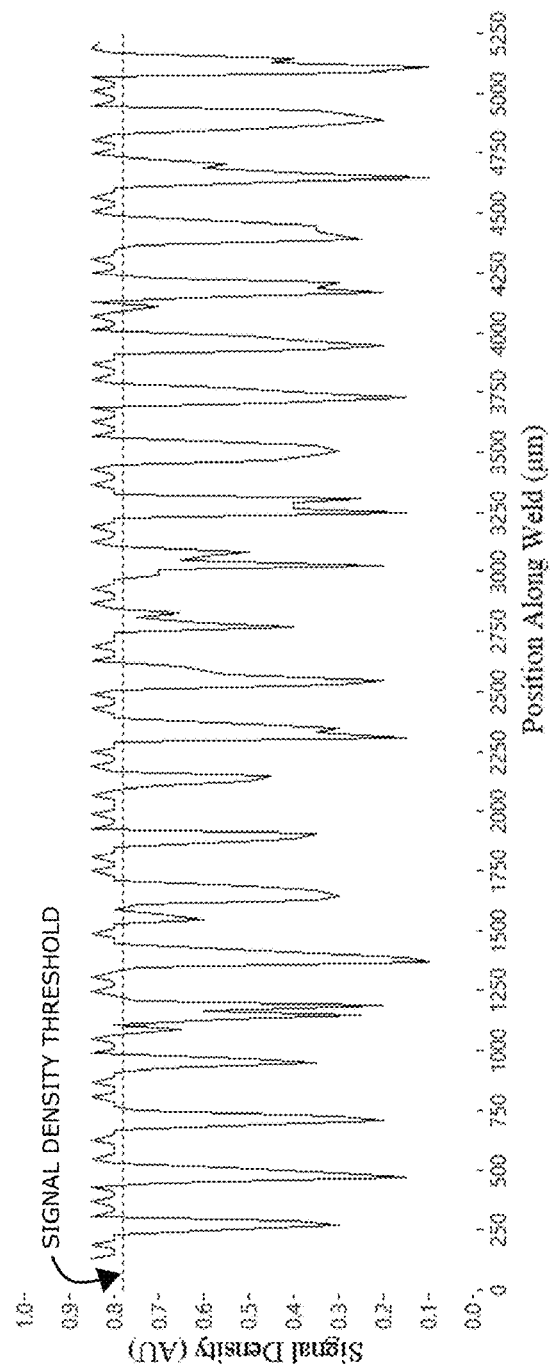
FIG. 15B shows a signal density plot corresponding to the depth tracked data in FIG. 15A with the dashed line showing a constant signal density threshold level used in subsequent processing steps.
Figure 15C:
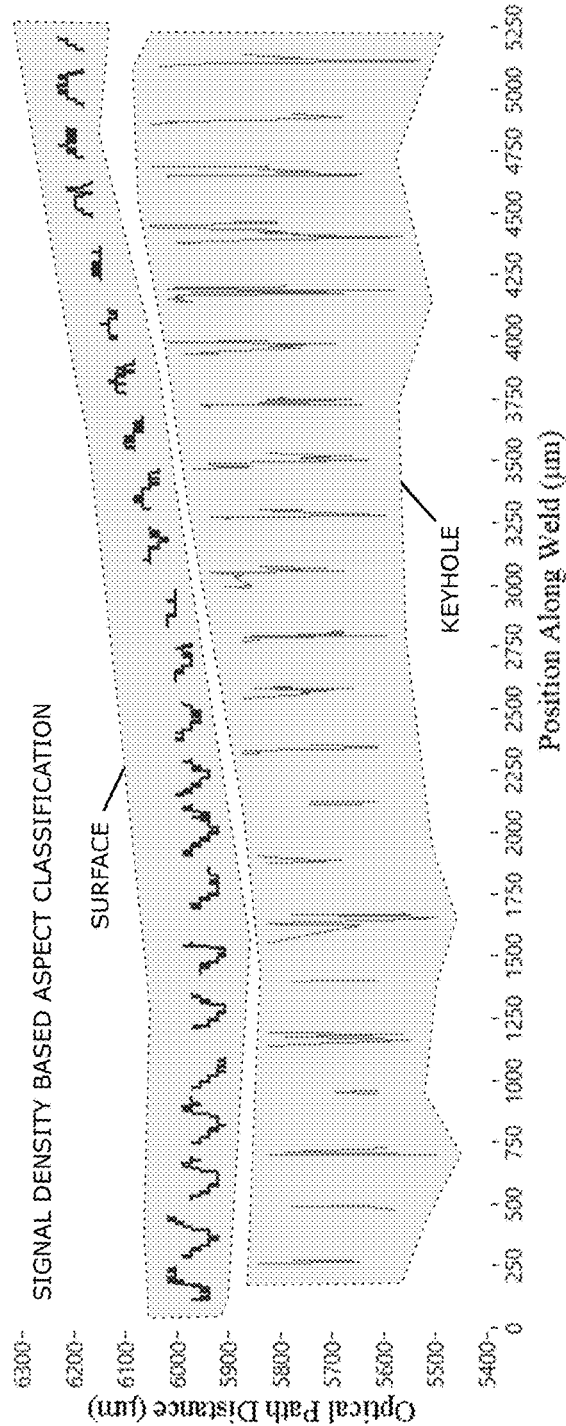
FIG. 15C shows plots of the depth tracked A-scan measurements from FIG. 15A classified as "surface" and "keyhole" depth measurements according to the signal density and threshold level of FIG. 15B, wherein classified channels are identified on the graph by the bounded regions.
Figure 15D:
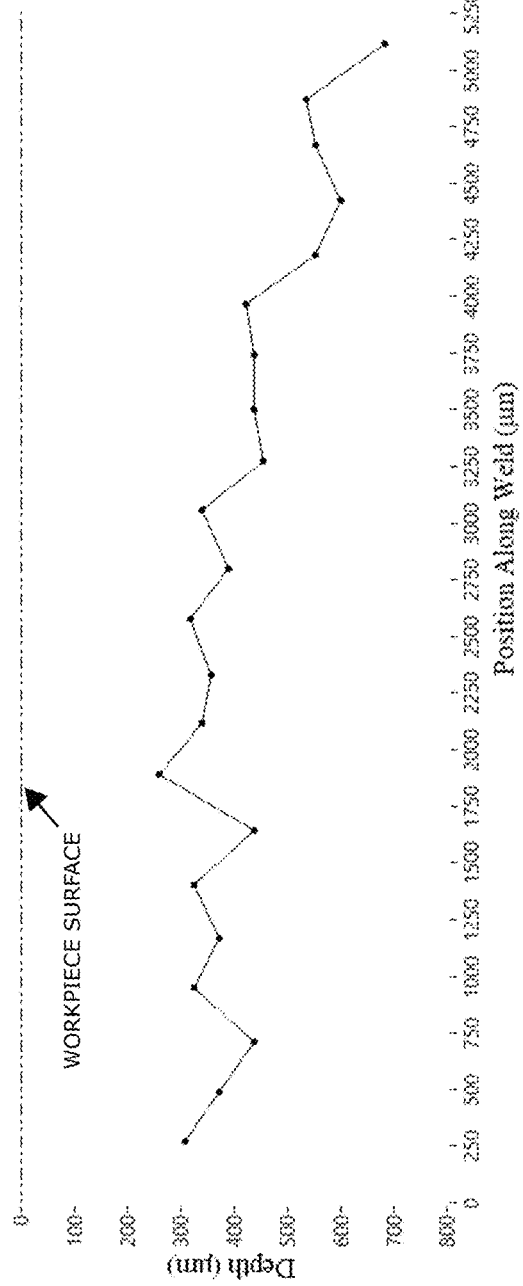
FIG. 15D shows a plot of keyhole depth referenced relative to its local surface height obtained by subtracting the keyhole depth and surface data in FIG. 15C, wherein the local surface height is represented by the dashed line at zero depth.

FIG. 15B shows the signal density plot corresponding to the depth tracked data in FIG. 15A. The signal density is compared against a constant signal density threshold level (0.78 in this example). A-scans with signal density values above the threshold are categorized as "surface" while those with values below the threshold are categorized as "keyhole" depth. The depth tracked data points from "keyhole" A-scans are plotted separately from the depth tracked data points from "surface" A-scans in FIG. 15C. The categorized data can then be used for additional data processing, quality assurance determinations, and feedback control signals, for example, as described above. In this example, the "keyhole" depth signal is subtracted from the "surface" signal to produce a depth measurement relative to the local surface of the workpiece (FIG. 15D). The surface-referenced keyhole depth may then be subject to its own quality assurance determination algorithms. The "surface" signal may also be used to correct optical path distance variations due to scanning optics.

Similar periodic temporal variations in the PCR are also observed in pulsed laser welding applications and can benefit from the classification described above. While the above example shows classification of A-scans for periodic PCR changes, the classification techniques described also benefit A-scans of a changing PCR, or other workpiece feature, where the changes are aperiodic in nature. Examples of processes that may produce such changes include those with varying process conditions (material type, laser power, welding speed, focus, shield gas, etc.) or those with more inherent instability.

Although the illustrated example shows "surface" or "keyhole" classifications, the concept of using imaging signal density to classify A-scans may be used to classify A-scans as pertaining to any aspect of a phase change region or workpiece sub-region. These aspects include, without limitation, vapor channel, vapor channel bottom, vapor channel sidewall, weld penetration depth, melt pool, workpiece surface, material composition, material phase, and material density.

Further application of the techniques described above include classification and identification of various aspects of the workpiece. For workpieces composed of multiple material types, signal density may be used to identify one material type from another or classify A-scans as belonging or not belonging to a specific material type. The inherently different optical and geometrical properties of different material types result in varying signal levels received by the imaging system. These signal levels manifest as different signal density readings, which in combination with thresholding algorithms, can be used to classify A-scans as corresponding to a specific material type. Such classification has utility in a variety of applications including, without limitation, dissimilar material laser welding, laser material removal, laser cleaning, laser additive manufacturing, and laser marking.

The material phase (e.g., solid, liquid, gas) or degree of material phase (e.g., semi-solid, semi-liquid) has similar influence on the measurement signal levels received by the imaging system and thus the signal density. Analysis of the signal density can be used to resolve one material phase, or degree of material phase, from another. This type of classification may benefit laser processing applications where it is often helpful to distinguish between solid (e.g., workpiece), liquid (e.g., melt pool), and gaseous (e.g., vapor channel in keyhole welding) aspects of the process.

Material density also produces changes in signal density levels similar in nature to those described above. For example, aggregate groupings of metal powder particles, such as those used in powder-based additive manufacturing, produce more diffuse scattering than their corresponding bulk solid forms. Diffuse scattering typically results in signal density readings that are distinguishable, for example by signal stability or signal level, from signal density readings associated with surfaces that are more specular in nature.

The included examples are meant to be a simple example of the benefits of A-scan classification based on signal density. The techniques described above may be extended to other applications.

More general uses include, but are not limited to, classifying A-scan acquisitions into one or more separate channels. These channels may be subject to additional analysis to measure or quantify aspects of the process. In addition to classification of A-scans as belonging to one channel or another, classification may also include identifying A-scans as not belonging to a channel.

The techniques described here may be especially useful when applied to applications or processes where a priori planning or synchronization to the process is not possible—for example as a result of hardware limitations or variable process conditions. The classification of A-scans helps to overcome such limitations by providing a posteriori synchronization to aspects of the process.

Systems, methods, algorithms, and software are provided for calculating the density of an inline coherent imaging signal. These methods can be used for monitoring or control of laser materials processing, or general inspection of materials, parts, components, products and the like.

In one embodiment, the ICI signal density is calculated by determining whether each A-scan contains a measurement point above a user-defined signal intensity threshold (e.g., measured in dB above detector noise floor, excluding a user-defined region around the zero-delay point), and then calculating the percentage of A-scans satisfying this condition within a user-defined distance or user-defined time over which the signal is accumulated (referred to as "bins").

In some embodiments, the bins may be defined end-to-end of a measurement beginning with the first A-scan acquired. In some embodiments, the bins may be defined in a consistent overlapping manner. In some embodiments, the bins may be defined in an overlapping manner relating to the positions of A-scans satisfying the condition above. In some embodiments, the resulting percentage values may be further smoothed by algorithms including, but not limited to, moving means, medians, or quantile filters.

In some embodiments, the data produced by the methods may be used for automated pass/fail or quality assessment of a laser material modification process, or automated pass/fail or quality assessment of materials, parts, components, products and the like.

In one embodiment, the intensity or density of the ICI signal is used to monitor the vapor channel in full-penetration laser or e-beam welding processes.

In another embodiment, the methods are used to monitor the vapor channel in partial-penetration laser or e-beam welding processes.

In another embodiment, the methods are used to monitor the melt pool in conduction-mode laser or e-beam welding processes.

In another embodiment, the methods are used to monitor the melt pool or nascent vapor channel in intermediate laser or e-beam welding processes falling between the typical energy density regimes of keyhole-mode and conduction mode welding processes.

In another embodiment, the methods are used to monitor the melt pool in partial-penetration or full penetration laser or e-beam welding processes.

In another embodiment, the methods are used to monitor the surface condition or characteristics of a material prior to or ahead of a laser or e-beam material modification process.

In another embodiment, the methods are used to monitor the surface condition or characteristics of a material after or behind a laser or e-beam material modification process.

In another embodiment, the methods are used to inspect the surface condition or characteristics of a material prior to or ahead of a laser or e-beam welding process.

In another embodiment, the methods are used to inspect the surface condition or characteristics of a material after or behind a laser or e-beam welding process, where the "material" may refer to either the weld fusion zone itself, the surrounding material, a material/surface coating, or some other surface relevant to the process.

The methods may be used to monitor the vapor channel in a full-penetration laser or e-beam welding process where the vapor channel is intended to encroach upon a subsurface hollow or void or in a full-penetration laser or e-beam welding process where the vapor channel is intended not to encroach upon a subsurface hollow or void. In some embodiments, the subsurface hollow or void may be a gas pocket or similar feature. In some embodiments, the vapor channel is intended to pass through the material into free space where another surface exists in the free space along the process axis. The surface in this free space may comprise a ledge or shelf or surface on the part or assembly to be welded, or a surface of the surrounding apparatus, or a surface of another component within the assembly to which the welded part belongs, or a surface of a sacrificial or temporary guard or shield in place during the welding process, or a surface of clamping, fixturing, gas delivery, or exhaust evacuation equipment present in the welding cell.

In another embodiment, the methods are used in parallel to other methods, algorithms and software applied to the same ICI data for extracting or calculating other metrics or measurements, such as the depth of penetration of the weld. In another embodiment, the results of the methods are used for monitoring, pass/fail assessment, or control of certain aspects of the welding process, independently of the results of the depth of penetration extraction methods applied in parallel to the same ICI data. In another embodiment, the results of the methods are used for monitoring, pass/fail assessment, or control of certain aspects of the welding process, in conjunction with the results of the depth of penetration extraction methods applied in parallel to the same ICI data.

In another embodiment, the methods are used in parallel to other methods, algorithms and software applied to other subsets of the ICI data acquired during the same laser material modification process for extracting or calculating other metrics or measurements.

In another embodiment, the methods are used in parallel to other methods, algorithms and software applied to other subsets of the ICI data acquired during the same laser or e-beam welding process for extracting and/or calculating the height of the material to be welded, the lateral position of seams, joints, or edges on the material or surrounding apparatus, the longitudinal surface profile of the finished weld or metrics and features derived therefrom, or the transverse surface profile of the finished weld or metrics and features derived therefrom.

In another embodiment, the calculated signal density may be used in aggregate with or in parallel with measured intensities from the same ICI data in order to better extract relevant information about the material, part, or process being measured. This intensity data may be filtered, smoothed or averaged.

In another embodiment, signal-density measurements are used to determine keyhole/weld stability for turbulent processes (e.g., aluminum/titanium/alloy welding).

In some embodiments, subsurface features may be deliberately engineered to facilitate backscatter of the ICI beam in a consistent or predictable manner, with the goal of more effectively using these methods. Such features may include gas pockets or channels, or other features either contained within the part or assembly below the process region, or located elsewhere in the region of the process beam axis. Such engineering may include geometry, surface finish, surface angle, material choice (e.g., capable of being identified by florescence or optical scattering), coating, cladding, painting or other design elements intended to facilitate measurement using these methods. Such design elements may also include venting or gas flow or melt flow management approaches designed to affect the laser process in a manner intended to facilitate measurement using these methods.

In another embodiment, multiple features of a phase change region (PCR) in a material being modified are illuminated with an ICI system either simultaneously or sequentially, and the signal density from each region in one or more dimensions is analyzed separately, and/or correlated between regions to indicate one or more parameters of the material modification process.

In another embodiment, the signal density from one or more regions in process is used to regulate the process. Such regulation could be in real time (intraprocess) or between multiple cycles.

In some embodiments, the ICI beam is dithered to compensate for instabilities in the process, particularly when two sides of a butt joint are of uneven thicknesses. In these cases, the motion of the workpieces relative to the process beam can have large impacts on the geometry of the PCR and the dithering compensates for the instabilities caused by this motion.

In some embodiments, the location of keyhole bottom measurement is changed based on other ICI measurements of the seam location and/or from ICI measurements of the PCR itself.

In a further embodiment, the ICI signal density is calculated for a full penetration laser weld having a shelf or other surface of material of the welded assembly transected by and approximately normal to the process axis less than 10 mm removed from the target weld joint on the side opposite from the welding beam delivery optics. The shelf of material is measured by the ICI beam passing through the fully-penetrated vapor channel (i.e., making a round-trip through the channel to the shelf and back) during the weld process. The density of the ICI signal is calculated along with weld penetration depth measurements extracted from the same ICI data in parallel. Logic is applied to the signal density measurement in conjunction with the weld penetration measurement to formulate automated pass/fail decisions for, or generate data relevant to automated control of, the laser welding process. The methods are applied in conjunction with other methods for monitoring the process based on seam position, material height, longitudinal finished weld surface profile and its derivative metrics, and transverse surface profile and its derivative metrics, and other measurements (and their derivative metrics) produced by inline coherent imaging or photodiode-based process monitoring systems.

Another aspect of the present disclosure relates to a computer readable storage medium that contains computer readable instructions which when executed by a processor cause the processor (or a device containing the processor) to perform the imaging signal density calculations consistent with the present disclosure. When used, the computer readable storage medium may be in the form of an article of manufacture. In some examples, the computer readable storage medium may be a non-transitory computer readable medium or machine readable storage medium, such as but not limited to an optical, magnetic or semiconductor storage medium. In any case the storage medium may include or store computer executable instructions, such as instructions to the operations of the method of calculating imaging signal density and monitoring and/or controlling material processing using imaging signal density. Non-limiting examples of suitable computer readable storage media that may be used include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method comprising:
generating a process beam and directing the process beam to a workpiece for material processing using a material processing system;
generating an imaging beam;
directing the imaging beam to the workpiece;
producing an interferometry output from at least a component of the imaging beam reflected from the workpiece;
producing a plurality of A-scans of the workpiece using the interferometry output; and
classifying A-scans of the plurality of A-scans as pertaining to at least one aspect of a phase change region or workpiece sub-region, wherein classifying the A-scans is performed using a monitoring system, wherein the A-scans are classified into categories representing the at least one aspect of the phase change region or the workpiece sub-region, and wherein the at least one aspect of the phase change region or workpiece sub-region is at least one of: vapor channel, vapor channel bottom, vapor channel sidewall, weld penetration depth, melt pool, workpiece surface, material composition, material phase, and material density.

2. The method of claim 1, further comprising
determining an imaging signal density from the interferometry data, and
using the imaging signal density to classify the A-scans.

3. The method of claim 2 wherein determining an imaging signal density includes determining whether each A-scan contains a measurement point above a signal intensity threshold and calculating a percentage of A-scans satisfying this condition within a bin of A-scans.

4. The method of claim 2 wherein classifying A-scans includes classifying A-scans based on the imaging signal density compared to a constant signal density threshold level.

5. The method of claim 1 further comprising determining at least one other measurement using the imaging beam.

6. The method of claim 5 wherein the at least one other measurement is a distance measurement.

7. The method of claim 6 wherein the distance measurement indicates depth of penetration.

8. The method of claim 1 further comprising modifying the workpiece to provide subsurface features to facilitate backscatter of the imaging beam.

9. The method of claim 1 wherein directing the process beam to the workpiece includes directing the process beam with a wobble pattern on the workpiece resulting in periodic spatial variations in alignment between an imaging beam measurement location and a phase change region (PCR) position.

10. A method comprising:
producing a plurality of A-scans of a workpiece using an inline coherent imaging (ICI) system, wherein the A-scans are spaced by distance or time; and
classifying A-scans as pertaining to at least one aspect of a phase change region or workpiece sub-region, wherein classifying the A-scans is performed using a monitoring system, wherein the A-scans are classified into categories representing the at least one aspect of the phase change region or the workpiece sub-region, and wherein the at least one aspect of the phase change region or workpiece sub-region is at least one of: vapor channel, vapor channel bottom, vapor channel sidewall, weld penetration depth, melt pool, workpiece surface, material composition, material phase, and material density.

11. The method of claim 10, further comprising
calculating an ICI signal density, and
using the ICI signal density to classify the A-scans.

12. The method of claim 11, wherein calculating the ICI signal density includes determining whether each A-scan contains a measurement point above a signal intensity threshold.

13. The method of claim 10 further comprising modifying the workpiece to provide subsurface features to facilitate backscatter of the imaging beam.

14. The method of claim 10 wherein directing the process beam to the workpiece includes directing the process beam with a wobble pattern on the workpiece resulting in periodic spatial variations in alignment between an imaging beam measurement location and a phase change region (PCR) position.

15. A system comprising:
a material processing system configured to generate a process beam and to direct the process beam toward a workpiece;
an inline coherent imaging (ICI) system configured to generate an imaging beam, to direct the imaging beam toward the workpiece together with the process beam, to produce an interferometer output from a reflection of the imaging beam, and to detect the interferometer output to produce ICI data; and
a monitoring system programmed to
receive the ICI data and to determine at least an ICI imaging signal density, and
classify at least one aspect of a phase change region or workpiece sub-region using the imaging signal density.

16. The system of claim 15 wherein the monitoring system is programmed to receive A-scan data representing a plurality of A-scans of a workpiece using ICI and to determine an ICI signal density.

17. The system of claim 16, wherein the monitoring system is programmed to determine the ICI signal density by determining whether each of the A-scans contains a measurement point above a threshold.

18. The system of claim 15, wherein the material processing system is configured to direct the process beam with a wobble pattern on the workpiece resulting in periodic spatial variations in alignment between an imaging beam measurement location and a phase change region (PCR) position.

* * * * *